(12) United States Patent
Chinen et al.

(10) Patent No.: US 12,417,522 B2
(45) Date of Patent: Sep. 16, 2025

(54) METHOD FOR CONSTRUCTING A PERCEPTUAL METRIC FOR JUDGING VIDEO QUALITY

(71) Applicant: Google LLC, Mountain View, CA (US)

(72) Inventors: Troy Chinen, Fremont, CA (US); Alex Sukhanov, Sunnyvale, CA (US); Eirikur Thor Agustsson, Zurich (CH); George Dan Toderici, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 441 days.

(21) Appl. No.: 17/486,359

(22) Filed: Sep. 27, 2021

(65) Prior Publication Data
US 2023/0099526 A1 Mar. 30, 2023

(51) Int. Cl.
| | |
|---|---|
| G06T 7/00 | (2017.01) |
| G06F 18/24 | (2023.01) |
| G06N 20/00 | (2019.01) |
| H04N 19/23 | (2014.01) |

(52) U.S. Cl.
CPC ............ *G06T 7/0002* (2013.01); *G06F 18/24* (2023.01); *G06N 20/00* (2019.01); *H04N 19/23* (2014.11); *G06T 2207/10016* (2013.01); *G06T 2207/20081* (2013.01); *G06T 2207/30168* (2013.01)

(58) Field of Classification Search
CPC ......... G06T 7/0002; G06T 2207/10016; G06T 2207/20081; G06T 2207/30168; G06F 18/24; G06N 20/00; G06N 3/0442; G06N 3/0464; G06N 3/084; H04N 19/23; G06V 10/82; G06V 20/46
See application file for complete search history.

(56) References Cited

U.S. PATENT DOCUMENTS

| | | | |
|---|---|---|---|
| 2016/0034786 A1* | 2/2016 | Suri .................. | G06F 18/214 382/159 |
| 2019/0246111 A1* | 8/2019 | Li ..................... | H04N 17/004 |
| 2021/0099715 A1* | 4/2021 | Topiwala ............ | H04N 19/174 |

(Continued)

FOREIGN PATENT DOCUMENTS

| | | | | |
|---|---|---|---|---|
| CN | 111062297 A | * | 1/2020 | ......... G06K 9/00718 |

OTHER PUBLICATIONS

Somraj et al., Understanding the Perceived Quality of Video Predictions, arXiv:2005.00356, Jun. 22 (Year: 2021).*

(Continued)

*Primary Examiner* — Ping Y Hsieh
*Assistant Examiner* — Xiao Liu
(74) *Attorney, Agent, or Firm* — DORITY & MANNING P.A.

(57) ABSTRACT

An example computer-implemented method for determining a perceptual quality of a subject video content item is provided. The example method can include inputting a subject frame set from the subject video content item into a first machine-learned model. The example method can also include generating, using the first machine-learned model, a feature based at least in part on the subject frame set. The example method can also include outputting, using a second machine-learned model, a score indicating the perceptual quality of the subject video content item based at least in part on the feature.

23 Claims, 7 Drawing Sheets

(56) References Cited

U.S. PATENT DOCUMENTS

2022/0051382 A1* 2/2022 Chen .................. H04N 21/4662

OTHER PUBLICATIONS

Bampis et al., "Spatio Temporal Feature Integration and Model Fusion for Full Reference Video Quality Assessment", Apr. 13, 2018, arXiv:1804.04813v1, arXiv.org, 12 pages.
Zhang et al., "Enhancing VMAF through New Feature Integration and Model Combination", Mar. 10, 2021, arXiv:2103.06338v1, arXiv.org; 5 pages.
Chinen et al., "Towards a Semantic Perceptual Image Metric", arXiv:1808.00447v1, Aug. 1, 2018, 5 pages.

* cited by examiner

METHOD FOR CONSTRUCTING A PERCEPTUAL METRIC FOR JUDGING VIDEO QUALITY

FIELD

The present disclosure relates generally to methods for judging video quality. More particularly, the present disclosure relates to systems and methods for constructing a perceptual metric for judging video quality.

BACKGROUND

Consumers of video content generally desire a high quality video experience. Many users view video content on various devices. Many users stream video content on internet-connected devices. In certain scenarios, video content may be processed for more compact delivery (e.g., via streaming on the internet). The viewer's experience with the video content may vary with the device used to view the content and/or the strength of the network connection over which the content is delivered. It may be desired to evaluate the quality of video content to improve a user experience in receiving and viewing the video content.

SUMMARY

Aspects and advantages of embodiments of the present disclosure will be set forth in part in the following description, or can be learned from the description, or can be learned through practice of the embodiments.

One example embodiment according to example aspects of the present disclosure is directed to a computer-implemented method for determining a perceptual quality of a subject video content item. The example method includes inputting, by one or more computing devices, a subject frame set from the subject video content item into a first machine-learned model. The example method also includes generating, by the one or more computing devices and using the first machine-learned model, a feature based at least in part on the subject frame set. The example method also includes outputting, by the one or more computing devices using a second machine-learned model, a score indicating the perceptual quality of the subject video content item based at least in part on the feature. In some embodiments of the example method, the subject frame set comprises a frame sequence, and generating the feature includes generating, by the one or more computing devices, flow data based at least in part on the frame sequence, and generating, by the one or more computing devices using the first machine-learned model, the feature based at least in part on the flow data. In some embodiments of the example method, generating the flow data includes determining, by the one or more computing devices, a difference between frames in the frame sequence. In some embodiments of the example method, the first machine-learned model includes an adapted image classifier model. In some embodiments of the example method, the adapted image classifier model comprises one or more weights re-trained for determining the perceptual quality of the subject video content item. In some embodiments of the example method, generating the feature includes inputting, by the one or more computing devices, reference data into the first machine-learned model, the reference data having been generated based at least in part on a reference frame set from a reference video content item. In some embodiments of the example method, the score correlates to a perceptual similarity between the subject video content item and the reference video content item.

In some embodiments of the example method, the example method also includes generating, by the one or more computing devices, a second feature based at least in part on a second subject frame set from the subject video content item. In some embodiments of the example method, the example method also includes determining, by the one or more computing devices, an aggregate feature based at least in part on the feature and the second feature. In some embodiments of the example method, the example method also includes inputting, by the one or more computing devices, the aggregate feature into the second machine-learned model. In some embodiments of the example method, the example method also includes determining, by the one or more computing devices, an objective function based at least in part on the score. In some embodiments of the example method, the example method also includes updating, by the one or more computing devices, one or more parameters of a video encoder based at least in part on the objective function. In some embodiments of the example method, the example method also includes encoding, by the one or more computing devices, a reference video content item based at least in part on the updated one or more parameters, the subject video content item being based at least in part on an encoding of the reference video content item.

One example embodiment according to example aspects of the present disclosure is directed to an example computing system for determining a perceptual quality of a subject video content item. The example computing system includes one or more processors and one or more memory devices storing computer-readable instructions that, when implemented, cause the one or more processors to perform operations. In one embodiment, the operations include inputting a subject frame set from the subject video content item into a first machine-learned model, generating, using the first machine-learned model, a feature based at least in part on the subject frame set, and outputting, using a second machine-learned model, a score indicating the perceptual quality of the subject video content item based at least in part on the feature.

In one embodiment of the example computing system, the subject frame set comprises a frame sequence, and generating the feature includes generating flow data based at least in part on the frame sequence and generating, using the first machine-learned model, the feature based at least in part on the flow data. In one embodiment of the example computing system, generating the flow data includes determining a difference between frames in the frame sequence. In one embodiment of the example computing system, the first machine-learned model comprises an adapted image classifier model. In one embodiment of the example computing system, generating the feature includes inputting reference data into the first machine learned model, the reference data having been generated based at least in part on a reference frame set from a reference video content item. In one embodiment of the example computing system, the score correlates to a perceptual similarity between the subject video content item and the reference video content item. In one embodiment of the example computing system, the operations further include generating a second feature based at least in part on a second subject frame set from the subject video content item, determining an aggregate feature based at least in part on the feature and the second feature, and inputting the aggregate feature into the second machine-learned model.

In one embodiment of the example computing system, the operations further include determining an objective function based at least in part on the score and updating one or more parameters of a video encoder based at least in part on the objective function. In one embodiment of the example computing system, the subject video content item is based at least in part on an encoding of a reference video content item, and the operations further include encoding the reference video content item based at least in part on the updated one or more parameters.

One example embodiment according to example aspects of the present disclosure is directed to an example computer-implemented method for determining a similarity between a subject video content item and a reference video content item. In one embodiment, the example method includes encoding, by one or more computing devices, the reference video content item according to one or more encoding parameters, wherein the subject video content item is obtained by decoding the encoded reference video content item. In one embodiment, the example method includes obtaining, by the one or more computing devices, flow data based at least in part on a frame sequence of the subject video content item, the flow data including a difference between frames in the frame sequence of the subject video content item. In one embodiment, the example method includes obtaining, by the one or more computing devices, reference flow data based at least in part on a frame sequence of the reference video content item, the reference flow data including a difference between frames in the frame sequence of the reference video content item. In one embodiment, the example method includes generating, by the one or more computing devices using a machine-learned model, a temporal feature based at least in part on the flow data and the reference flow data. In one embodiment, the example method includes obtaining, by the one or more computing devices, a score indicating the perceptual similarity of the subject video content item to the reference video content item based at least in part on the temporal feature. In one embodiment, the example method includes updating, by the one or more computing devices, the one or more encoding parameters based at least in part on the score. In one embodiment, the example method includes encoding, by the one or more computing devices, a second reference video content item according to the updated one or more encoding parameters.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures.

Reference numerals that are repeated across plural figures are intended to identify the same features in various implementations.

DETAILED DESCRIPTION

Overview

Example aspects of the present disclosure are directed to systems and methods for determining a perceptual quality of video content. More particularly, example aspects are directed to determining a perceptual quality score using one or more features based on the video content and generated by a machine-learned model. For instance, a perceptual quality score may correlate to an opinion of consumers of the video content relating to their experience with the video content. Example embodiments may output a perceptual quality score for a video content item that may be used to evaluate and deliver higher quality video content to users. Advantageously, embodiments of the present disclosure can provide perceptual quality scores with improved correlation to an experience of a consumer of the video content, improving the ability to predict a consumer response to video content items.

Example embodiments according to aspects of the present disclosure are directed to a machine-learned feature extraction model that generates one or more features for input to a perceptual quality model. For example, one or more frames of a subject video content item may be input to the machine-learned feature extraction model, and the model can output one or more features based on the frames. The features may comprise, in various embodiments, spatial and/or temporal features (e.g., features based on content of the frame, features based on changes between frames, etc.). The feature extraction model may, in some embodiments, generate one or more features that effectively correspond at least in part to high-level, semantic information about the input frame or frames. In some embodiments, the feature extraction model may include a partial or complete architecture of an adapted image recognition or classification model. In some embodiments, the features may effectively correspond to aspects of interest in the input frames (e.g., identifying characteristics of elements in the frame, moving elements in frame, etc.). The features, in turn, may be used to determine a perceptual quality score. For instance, the features may be optionally further processed (e.g., combined, aggregated, binned, etc.) and input into a machine-learned perceptual quality model to determine a perceptual quality score for the subject video content item (or a portion thereof).

Example embodiments according to aspects of the present disclosure can provide for features that, when used as an input to a perceptual quality model, promote improved perceptual quality scoring with improved correlation to consumer opinion metrics. For instance, in some embodiments, features generated according to aspects of the present disclosure can advantageously improve the ability for the perceptual quality model to predict a perceptual quality as experienced by a viewer. In some embodiments, the perceptual quality model may also provide for a similarity comparison between two video content items (e.g., a subject video content item and a reference video content item) that correlates to a perceptual similarity experienced by one or more consumers of the video content items. In one example, for instance, the perceptual quality model may offer improved correlation to user experience when using one or more features that effectively correspond to semantic visual cues in the video content frames, as a viewer may perceive the video content with heightened sensitivity to the quality with which those visual cues are displayed. In this manner, for example, systems and methods of the present disclosure can provide for more accurate prediction of a user experience.

Example embodiments according to aspects of the present disclosure are also directed to machine-learned video content encoding codecs. For instance, the perceptual quality score may be used as an objective for training a machine-learned codec (e.g., as part of an objective function). In this manner, for example, one or more parameters of a video encoder and/or decoder may be learned to improve the perceived quality of video content as experienced by a consumer of the video content and/or to reduce data requirements for delivering content while maintaining a target perceptual quality.

In one example embodiment according to aspects of the present disclosure, a perceptual quality may correspond to a perceived clarity, definition, smoothness, and/or other user-discernable characteristics of a video content item. For instance, in one embodiment, a perceptual quality may correlate to an opinion of a consumer of video content about the experience with the video content item. The perceptual quality may correlate to, for example, the experience of viewing the video content, the presence of discernible defects or distortions in the video content, whether the video content is displayed in an appealing or pleasing manner, or other factors relating to a consumer's perceptions of the video content. In some embodiments, a perceptual quality can correlate to, for example, a Mean Opinion Score metric, such as according to ITU-T Recommendation P.1204, P.1204.1-5.

In one example embodiment according to aspects of the present disclosure, a video content item can be any set of image data configured for display of a plurality of images in sequence. For instance, a video content item can comprise a set of frames (e.g., one or more) of a video associated with instructions to display the one or more frames in a sequence on a display device. In various embodiments, the video can comprise any one or more of photographic imagery, videographic imagery, and any other kind of digital imagery, including synthesized imagery (e.g., raster or vector), textual imagery, and other symbolic or pictographic representations of information configured for display.

In one example embodiment according to aspects of the present disclosure, video content items may be configured for a passive viewing experience, an interactive experience, or both. For example, a video content item may be a movie, periodic show, social media video, news segment, live stream, slideshow, meme, GIF, snippet, etc. that is generally viewed passively without interaction with a user or otherwise containing content subject to the direction of the user. In some embodiments, video content items may be configured for an interactive experience. For instance, a video content item may be, or include elements that are, responsive to one or more user inputs. For instance, a video content item can comprise one or more frames that were processed (e.g., drawn, generated, rendered, etc.) based at least in part on a response to an input from a user. For instance, a video content item can, in some embodiments, display interactive content in substantially real-time. In one example, a video content item can include frames from a video game subject to the user's control (e.g., being played by the user in substantially real-time).

In one example embodiment according to aspects of the present disclosure, the video content item may be experienced by a user by display on one or more display devices. In various embodiments, a user's experience of the video content item may vary when one display device is used as compared to when another display device is used. For instance, different display devices may use display screens having different specifications (e.g., size, brightness, gamut, contrast ratio, response time, directionality, pixel density, surface finish, etc.), may correspond to different use cases (e.g., in bright environments, on the move, at home, at a desk, etc.), and/or may be positioned differently with respect to the user (e.g., a mobile device held close to user, a large-format display device for viewing across a room, etc.). Any one or more of these differences between display devices can contribute to a different experience by a user, a different set of quality expectations held by the user, or both.

In one example embodiment according to aspects of the present disclosure, a perceptual quality may be determined for a subject video content item directly. For instance, the perceptual quality determined for a subject video content item can correlate to a user's perception of quality of the subject video content item standing alone (e.g., without a direct comparison to another video content item). In some embodiments, a perceptual quality may be determined for a subject video content item by comparison to a reference video content item. For instance, in some embodiments, a perceptual quality model can determine a perceptual similarity between a subject video content item and a reference video content item. In this manner, too, the perceptual quality determined for a subject video content item can correlate to a user's perception of quality of the subject video content item standing alone (e.g., without a direct comparison to another video content item). Additionally, in some embodiments, the perceptual quality determined for a video content item can correlate to a user's perception of similarity of the subject video content item to another video content item.

In some embodiments, a reference video content item can be an original version of a video, and a subject video content item can be a distorted or otherwise degraded version of the video. In some embodiments, the reference video content item can also be a degraded version of the video (e.g., differently distorted than the subject video content item, such as a version encoded differently and/or with different or less degradation).

In one example embodiment according to aspects of the present disclosure, a set of frames of a video content item can be input into a feature extraction model. In some embodiments, the feature extraction model may be configured to generate one or more features that encode or otherwise correspond to perceptual characteristics of the set of frames (e.g., PSNR, SSIM, MS-SSIM, LPIPS, PIM, NLPD, etc.). In some embodiments, the feature extraction model may be configured, for example, to receive a frame (e.g., image data descriptive of the frame) and generate features that incorporate or embed higher-level information about the imagery contained within the frame. In some embodiments, one or more feature values may not correspond to human-intelligible information. In some embodiments, one or more features may effectively correspond to or otherwise respond at least in part to semantic features of or in the frame. For instance, in some embodiments, a feature extraction model can effectively semantically weight input data (e.g., by generating an output feature that is more responsive to perceptual qualities relating to or affecting semantic features in the input data).

In some embodiments, a feature extraction model can include a machine-learned model. For instance, a machine-learned feature extraction model may include a neural network (e.g., a deep neural network). In some embodiments, a machine-learned feature extraction model may include a neural network having a structure configured for use in image recognition tasks (e.g., one or more structures or model architectures of an image classifier model architecture). In some embodiments, a machine-learned feature extraction model may include an image classifier model with one or more weights that were trained—or re-trained—for determining a perceptual quality of a video content item.

For example, in one embodiment, a feature extraction model (e.g., a machine-learned feature extraction model) can generate one or more features from a set of frames that correspond to a user's perceived experience of watching playback of the set of frames. For instance, in some embodiments, one or more features generated by the feature extraction model may effectively highlight or otherwise respond to aspects of the imagery contained in the set of frames that correspond to a likely focus of a user's attention when viewing the set of frames.

In some embodiments, for instance, the feature extraction model can contain an adapted image classifier model architecture that generates features which effectively correspond to semantic features in the set of frames (e.g., people, faces, animals, objects, locations, landmarks, etc.), which advantageously can correspond to the aspects of the imagery about which the user may be expecting or desiring to perceive in higher quality while viewing the video content item. An adapted image classifier model architecture can include, for instance, all or part of a pre-trained image classifier (e.g., all or part of an instance of VGG-16, MobileNet, Inception v3, etc.). In some embodiments, an adapted image classifier model architecture can include, for instance, an image classifier model architecture (e.g., all or part of an instance of VGG-16, MobileNet, Inception v3, etc.) having one or more of its weights (e.g., several weights, most weights, all weights, etc.) trained or re-trained for determining a perceptual quality of a video content item. In some embodiments, one or more weights of the adapted image classifier model architecture can be re-trained for determining a perceptual quality of a video content item (e.g., tuned) after being initialized with weights pre-trained for an image classification task. In some embodiments, the adapted image classifier model architecture may have one or more of its layer outputs linearly combined according to a set of learnable weights applied to the output of each layer, with the learnable weights trained for determining a perceptual quality of a video content item according to example embodiments of the present disclosure. In some embodiments, the adapted image classifier model architecture may have one or more of its layer outputs nonlinearly combined by a machine-learned model accepting the layer outputs as inputs.

In one example embodiment, one or more features generated by the feature extraction model can encode or otherwise represent spatial information. For instance, one or more spatial features of a frame can include information determined by reference to other portions of the frame (e.g., describing how the data in the frame changes across the frame). For instance, spatial information can include measures of noise, luminance, contrast, gamut, identity (e.g., of the scene or elements depicted), etc. In some embodiments, one or more spatial features can include values relating to, for example, Peak Signal-to-Noise Ratio, Structural Similarity Index Measure, Multi-Scale Structural Similarity Index Measure, Learned Perceptual Image Patch Similarity, Perceptual Information Metric, Learned Perceptual Image Patch Similarity, Pmetric, Normalized Laplacian Pyramid Distance, etc.

In various embodiments, in addition to (or in alternative to) spatial features, one or more features generated by the feature extraction model can encode temporal information (e.g., describing how data in the frame changes in time). For instance, the feature extraction model can generate features that track or otherwise respond to changes between a sequence of frames in the set of frames. In some examples, the frames may be adjacent (e.g., adjacent in a playback sequence), although the frames may be non-adjacent in other examples. In one embodiment, for example, the feature extraction model can generate one or more features based at least in part on a difference (e.g., a subtractive difference, etc.) determined between frames in the set of frames.

In one example embodiment according to aspects of the present disclosure, flow data may be generated to capture or otherwise represent changes between two or more frames of the video content item. In some embodiments, flow data can comprise linear combinations of frames or portions of frames. For example, generating flow data may include, for example, taking a subtractive difference between two frames. In some examples, the flow data can comprise the resulting subtractive difference. In addition to, or in alternative to, the subtractive difference between frames, flow data can also comprise one or more rates of change between frames, including rates computed across more than two frames (e.g., second, third, and/or higher order differences), and/or other data descriptive of the change between the frames (e.g., historical rate values, maximum and minimum rate values, etc.).

In some embodiments, a feature extraction model can generate one or more features based at least in part on a set of frames from a subject video content item and a set of frames from a reference video content item. For instance, a feature extraction model can generate a feature by comparing a subject frame set to a reference frame set. In some embodiments, a feature extraction model can generate a feature by comparing data based on or otherwise derived from a subject frame set with data based on or otherwise derived from a reference frame set. In one embodiment, for example, the feature extraction model can generate a feature by comparing flow data associated with a subject frame set with flow data associated with a reference frame set.

In one example embodiment according to aspects of the present disclosure, one or more features generated by one or more feature extraction models may be combined. For example, the one or more features can be linearly combined, nonlinearly combined, or both. In some embodiments, one or more features are combined (e.g., linearly, nonlinearly) for input into a perceptual quality model. In some embodiments, a plurality of features may be input separately into a perceptual quality model.

In some embodiments, one or more features can be generated for a frame or set of frames. In some embodiments, one or more features can be generated for a subportion of a frame (or a corresponding subportion of each frame of a set of frames). For instance, in some embodiments, one or more different features can be generated for each of a plurality of subportions of a frame (or a corresponding subportion of each frame of a set of frames). In some embodiments, the different features generated for different subportions may be chosen based at least in part on a likely area of attention for the user (e.g., based on saliency, semantic elements, etc.).

In some embodiments, one or more features generated for one frame or a first frame set and one or more features generated for another frame or a second frame set may be processed (e.g., by a perceptual aggregator model) to provide an aggregate feature value for both frames or frame sets. For example, a video content item may comprise a plurality of frames that may be subdivided into a plurality of frame sets. One or more features may be generated by the feature extraction model for each of the frame sets, and the one or more features may be processed to generate an aggregate feature value for the plurality of frames. In some examples, generating an aggregate feature value with a perceptual aggregator model can comprise the processing of various statistical markers, including a mean feature value, a median feature value, an n-th percentile feature value, the values of one or more histogram bins, etc. In some examples, generating an aggregate feature value with a perceptual aggregator model can comprise linearly combining the respective feature values of the plurality of frame sets. In some examples, generating an aggregate feature value with a perceptual aggregator model can comprise nonlinearly combining the respective feature values of the plurality of frame sets. In some examples, generating an aggregate feature value can comprise inputting the respective feature values of the plurality of frame sets into a perceptual aggregator model (e.g., a machine-learned model, such as a neural network, etc.) and outputting an aggregate feature value.

In one example embodiment according to aspects of the present disclosure, a perceptual quality model can output a perceptual quality score based at least in part on one or more features generated by the perceptual quality model. For instance, an input to the perceptual quality model can comprise one or more of the features directly, and additionally, or alternatively, in some embodiments, an input can comprise an aggregate feature value or a plurality of aggregated feature values. In some embodiments, a perceptual quality model comprises a nonlinear model. In some embodiments, a perceptual quality model comprises a machine-learned model (e.g., a neural network).

In one example embodiment according to aspects of the present disclosure, a perceptual quality score can correlate to a predicted experience of a user with the subject video content item. For instance, the perceptual quality score can, in some embodiments, correlate with a predicted opinion of the user regarding a perceptual quality of the subject video content item. In some embodiments, the perceptual quality score can be a numerical output corresponding to a predicted numerical rating by a human observer. In some embodiments, the predicted numerical rating can correspond to, for example, a Mean Opinion Score metric, such as according to ITU-T Recommendation P.1204, P.1204.1-5. In some embodiments, a perceptual quality score can be any output value having a correlation to a perceptual quality of a subject video content item, such as a similarity between the subject video content item and a reference video content item.

In one example embodiment according to aspects of the present disclosure, any one or several of the feature extraction model, the perceptual aggregator model, and the perceptual quality model may comprise one or more machine-learned models. In some embodiments, the machine-learned models can be trained together. In some embodiments, one or more machine-learned models can be trained separately from one or more other machine-learned models. In some embodiments, for example, a feature extraction model can comprise an adapted image classifier model. For instance, a feature extraction model can comprise one or more parameters initially trained on a first corpus of training examples (e.g., classification data for images, such as annotated or labeled images) and one or more parameters (e.g., the same parameters and/or different parameters) trained on a second corpus of training examples (e.g., perceptual quality data for video content and/or image content, such as rated or scored video and/or images).

In some examples, a set of training data for training one or more machine-learned models according to example aspects of the present disclosure can include data associating video content and/or image content with viewer feedback (e.g., a score for content input by a viewer while or after viewing the content) regarding the perceptual quality of the content. The data can include one or more scores or values associated with the content, including, for example, an MOS or other numerical rating, natural language feedback, a preference indicator (e.g., a value indicating a selection of one content item as preferred over another content item), combinations thereof, or other indicators of an opinion regarding the perceptual quality of the content. The training data may also include, for example, data indicating one or more characteristics of the device used to display the content to the user (e.g., manufacturer, model, screen size, screen technology, screen brightness, screen color temperature, screen gamut, screen contrast ratio, screen refresh rate, screen directionality pixel density, maximum frame rendering rate, etc.). The training data may include, for example, data indicating one or more characteristics of the context in which the device was used (e.g., room brightness, room lighting temperature, viewing angle, viewing distance, viewing duration, solo vs. group viewing, etc.). The training data may include, for example, data indicating one or more characteristics of the user (e.g., age, visual impairment, predicted and/or indicated interest in content, etc.). The training data may also include, for example, data indicating one or more characteristics of the content (e.g., title, genre, duration, resolution, bit depth, bit depth of any corresponding audio recording, visual or artistic style, target distribution platform, closed captioning, description of scene depicted, etc.).

In some embodiments, for example, training data may be used to learn one or more parameters of any one or several of the feature extraction model, the perceptual aggregator model, and the perceptual quality model. For instance, the training data may be used to learn parameters that improve the ability of the model(s) to predict a perceptual quality score that correlates to a user's opinion. In some embodiments, for example, a loss can be determined based at least in part on a difference between an actual and a predicted perceptual quality score, and any or all of the model(s) can be trained to decrease the loss.

In some embodiments, for instance, any one or several of the feature extraction model, the perceptual aggregator model, and the perceptual quality model can be trained to predict a perceptual quality score for content, with data indicating characteristics of the display device, the display context, the user, and/or the content also being used as an input. In this manner, for example, the predicted perceptual quality score can be responsive to such characteristics (or other characteristics learned or otherwise predicted from the training data).

In some embodiments, different instances of any one or several of the model(s) can be trained separately using various subsets of the training data. For example, in one embodiment, an instance of any one or several of the feature extraction model, the perceptual aggregator model, and the perceptual quality model can be especially trained to predict a perceptual quality score for, e.g., content being displayed on a particular type of display device (e.g., using training data associated with that type of display device), or any other particular characteristic or set of characteristics. Another instance can, for example, be trained to predict a perceptual quality score for content associated with a different characteristic or set of characteristics. In this manner, for example, the predicted perceptual quality score can be responsive to such characteristics (or other characteristics learned or otherwise predicted from the training data).

In one example embodiment according to aspects of the present disclosure, a perceptual quality score can be used as an objective for training a machine-learned model. For example, in some embodiments, a perceptual quality score can be used as a training objective for learning one or more parameters of a machine-learned codec. For example, a machine-learned codec can be used to encode a reference video content item. The encoding can be decoded (e.g., with or without being transmitted and/or subjected to a simulated transmission) according to the codec to produce a subject video content item. In some embodiments, the codec comprises a compression algorithm for decreasing the data used or required to store, transmit, or otherwise represent the video content and/or a processing cost of rendering the video content. In some embodiments, distortion or other degradation effects can result from compression of the video content, such that the compressed video content item is a distorted version of the original. By predicting a perceptual quality score for the subject video content item according to example aspects of the present disclosure and using the score as an objective for training one or more parameters of the codec, a codec may be learned that decreases perceived and/or actual distortion or degradation resulting from the compression.

Systems and methods according to example aspects of the present disclosure can provide for a number of technical effects and benefits, including improvements to computing systems, devices, and technology. For example, systems and methods according to example aspects of the present disclosure can provide for improved evaluation of perceptual quality of video content items, decreasing the need for costly (e.g., in time, in energy, in resources, etc.) manual scoring of perceptual quality for video content items. Furthermore, systems and methods according to example aspects of the present disclosure can enable improved user experiences by allowing video content items to be delivered which better match user expectations for a given device, in a given context, or with given content. For instance, systems and methods according to example aspects of the present disclosure can provide for video content items that can be tailored to a user, a user's device, and/or a user's context, to provide a consistent user experience that is robust to changes in such factors.

Additionally, in a content streaming context, for example, systems and methods according to example aspects of the present disclosure can provide for a given data transmission budget to be better allocated to deliver a target perceptual quality. For example, in some embodiments, because perceptual quality scores of systems and methods according to example aspects of the present disclosure can provide better correlation with viewer opinion, a data transmission budget can be expended in a more impactful manner to achieve a desired quality level. Additionally, or alternatively, a data transmission budget can be reduced while maintaining a target perceptual quality by better allocating a data transmission budget to deliver video content items having a predicted perceptual quality that better corresponds to the recipient's experience. In this manner, for example, fewer computing resources and less energy may be required to deliver video content that matches or even exceeds user expectations.

Additionally, in an interactive streaming context, for example, by improving the perceptual quality for a given data transmission budget (or, by reducing the required data budget for a target perceptual quality), systems and methods according to example aspects of the present disclosure can provide for an improved interactive experience (e.g., lower latency, more perceived immersion, better graphics, etc.) by posing less of a burden on local processing resources for a given perceptual quality level and freeing resources for other processing tasks (e.g., processing user inputs, processing updates from other network-connected users, providing more robust network transmission, etc.).

Additionally, for example, systems and methods according to example aspects of the present disclosure can provide for codecs (e.g., compression, lossless, etc.) with improved perceptual quality performance without requiring manual evaluation of a potentially vast search space of codec parameters. In some embodiments, systems and methods according to example aspects of the present disclosure can provide for codecs that can be tailored to provide a consistent experience for a user that is robust to changes in the user, the user's device(s), and/or the user's context.

Figure 1:
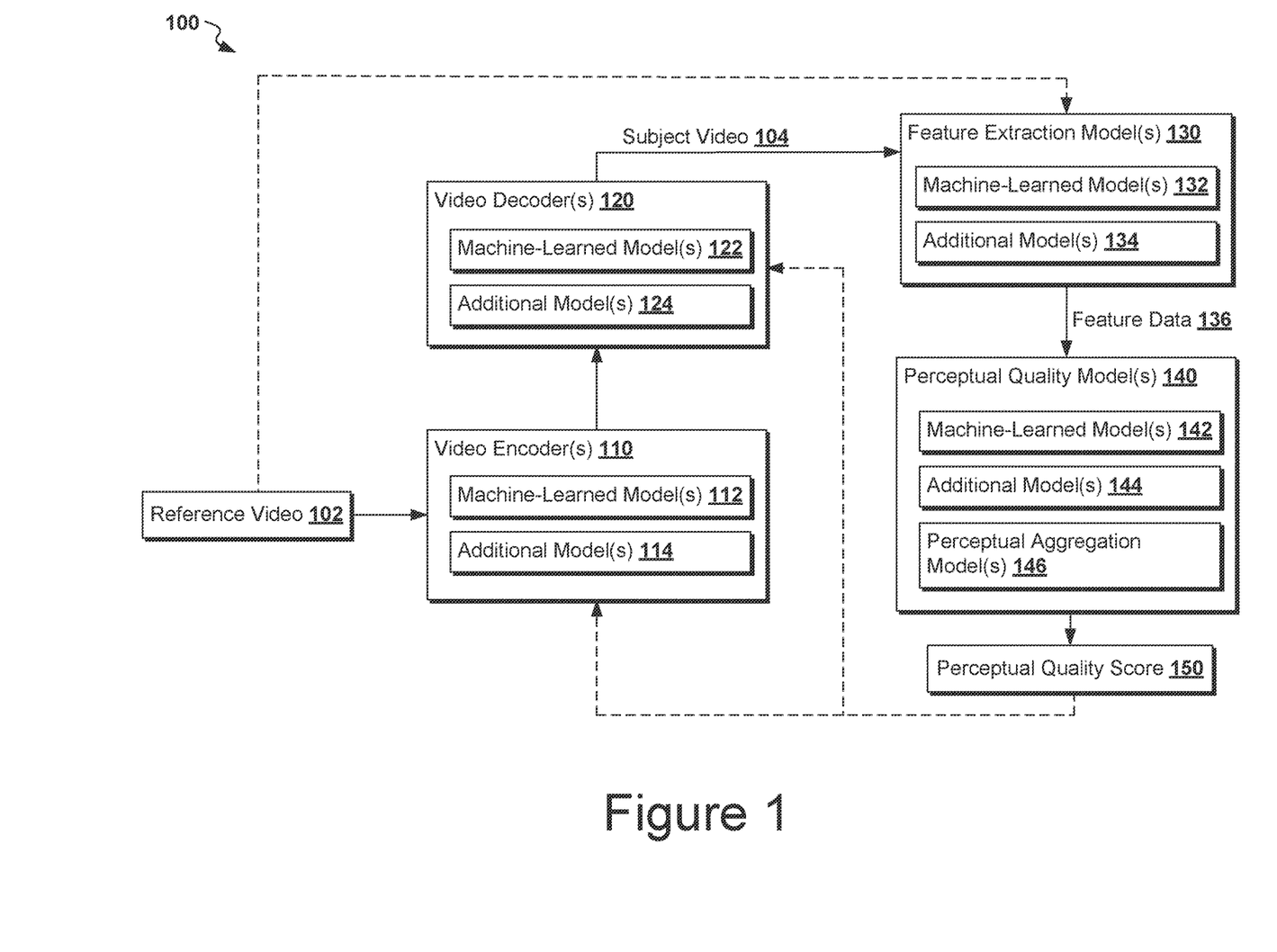
FIG. 1 depicts one example embodiment of a system for determining a perceptual quality and optionally training video encoder(s) and/or video decoder(s) according to example aspects of the present disclosure.

With reference now to the Figures, example embodiments of the present disclosure will be discussed in further detail. FIG. 1 depicts a flow diagram of one example embodiment of a system 100 according to aspects of the present disclosure. In the example system 100 shown, a perceptual quality of subject video 104 is evaluated. A reference video 102 is input into video encoder(s) 110, which may include machine-learned model(s) 112 and/or additional model(s) 114. The output encoded data stream may be input into video decoder(s) 120, which may include machine-learned model(s) 122 and/or additional model(s) 124. The decoded video comprises the subject video 104. One or more frames of the subject video 104 are input into feature extraction model(s) 130, which may include machine-learned model(s) 132 and/or additional model(s) 134. In some embodiments, reference video 102 is also passed to feature extraction model(s) 130.

Feature data 136, (e.g., data descriptive of features generated by the feature extraction model(s) 130) may be input into perceptual quality model(s) 140, which may include machine-learned model(s) 142 and/or additional model(s) 144, and which may output perceptual quality score 150. In some embodiments, the perceptual quality model(s) 140 comprise perceptual aggregation model(s) 146 (e.g., which may comprise one or more machine-learned model(s) itself, or may be formed at least in part by, e.g., machine-learned model(s) 142 and/or additional model(s) 144). In some embodiments, the feature extraction model(s) 130 comprise perceptual aggregation model(s) 146.

In some embodiments, perceptual quality score 150 is used to learn one or more parameters of the video encoder(s) 110 and/or one or more parameters of the video decoder(s) 120.

In some embodiments, reference data based at least in part on the reference video 102 is passed to the feature extraction model(s) 130 in addition or in alternative to passing the reference video 102 itself. In some embodiments, reference data can include, for example, pre-computed features of the reference video 102.

Figure 2:
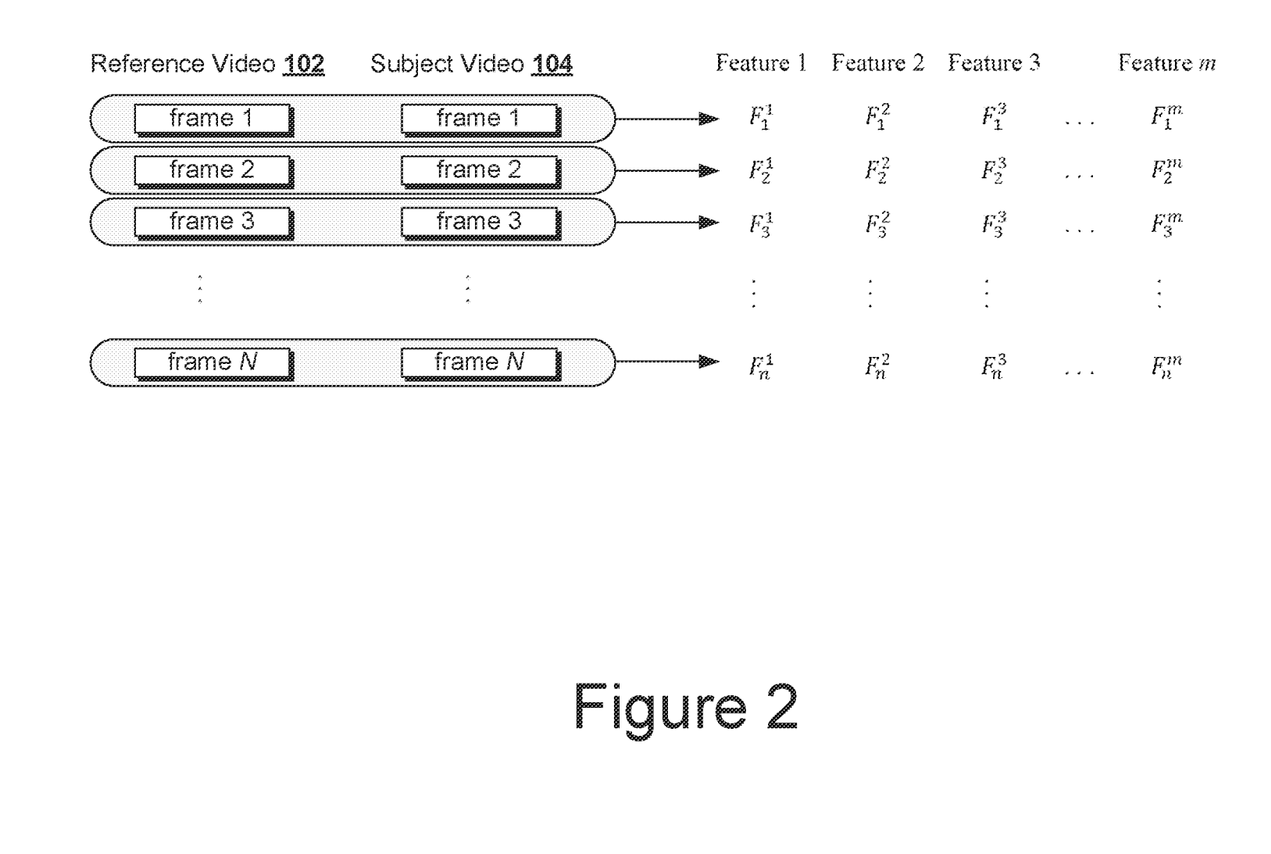
FIG. 2 depicts one example embodiment of a set of features generated for example frame sets of a reference video and a subject video according to example aspects of the present disclosure.

FIG. 2 depicts an illustration of how, in one example embodiment, m features may be generated for N frames of a subject video 104 (e.g., with comparison to a reference video 102). In some embodiments, the features are spatial features that, for example, may be calculated based on the content of corresponding frames of the respective videos at a particular instant in time.

Figure 3:
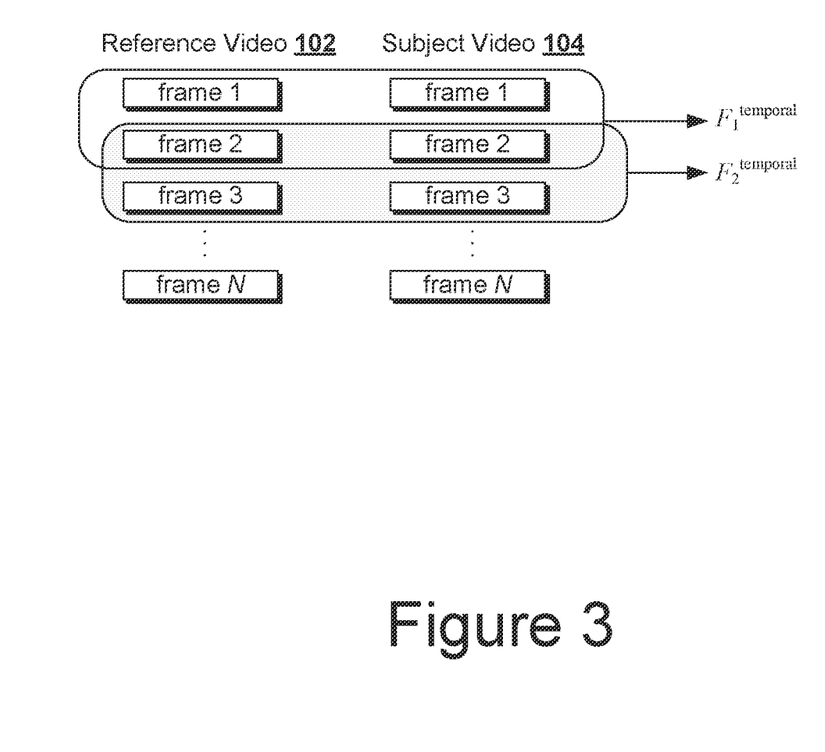
FIG. 3 depicts one example embodiment of a set of temporal features generated for two example frame sets of a reference video and a subject video according to example aspects of the present disclosure.

FIG. 3 depicts an illustration of how, in one example embodiment, temporal features may be generated for two frame sets of a subject video 104 (e.g., with comparison to a reference video 102). For instance, in one example, $$F_1^{temporal}=f(Ref\_Vid(frame\_1, frame\_2), Sub\_Vid(frame\_1, frame\_2))$$

and $$F_2^{temporal}=f(Ref\_Vid(frame\_2, frame\_3), Sub\_Vid(frame\_2, frame\_3)),$$

such that $F_1^{temporal}$ captures information about changes in the respective videos between frame 1 and frame 2 (e.g., flow data) and $F_2^{temporal}$ captures information about changes in the respective videos between frame 2 and frame 3 (e.g., flow data). In some embodiments, $F_N^{temporal}$ (e.g., a temporal feature associated with a frame set N) comprises flow data for a frame set of a reference video 102 (e.g., a reference frame set) and a frame set of a subject video 104 (e.g., a subject frame set). In some embodiments, for example, feature extraction model(s) 130 may output one or more temporal features $F_N^{temporal}$ responsive to one or more input frame sets (e.g., a subject frame set and reference data, such as a reference frame set).

Example Devices and Systems

Figure 4A:
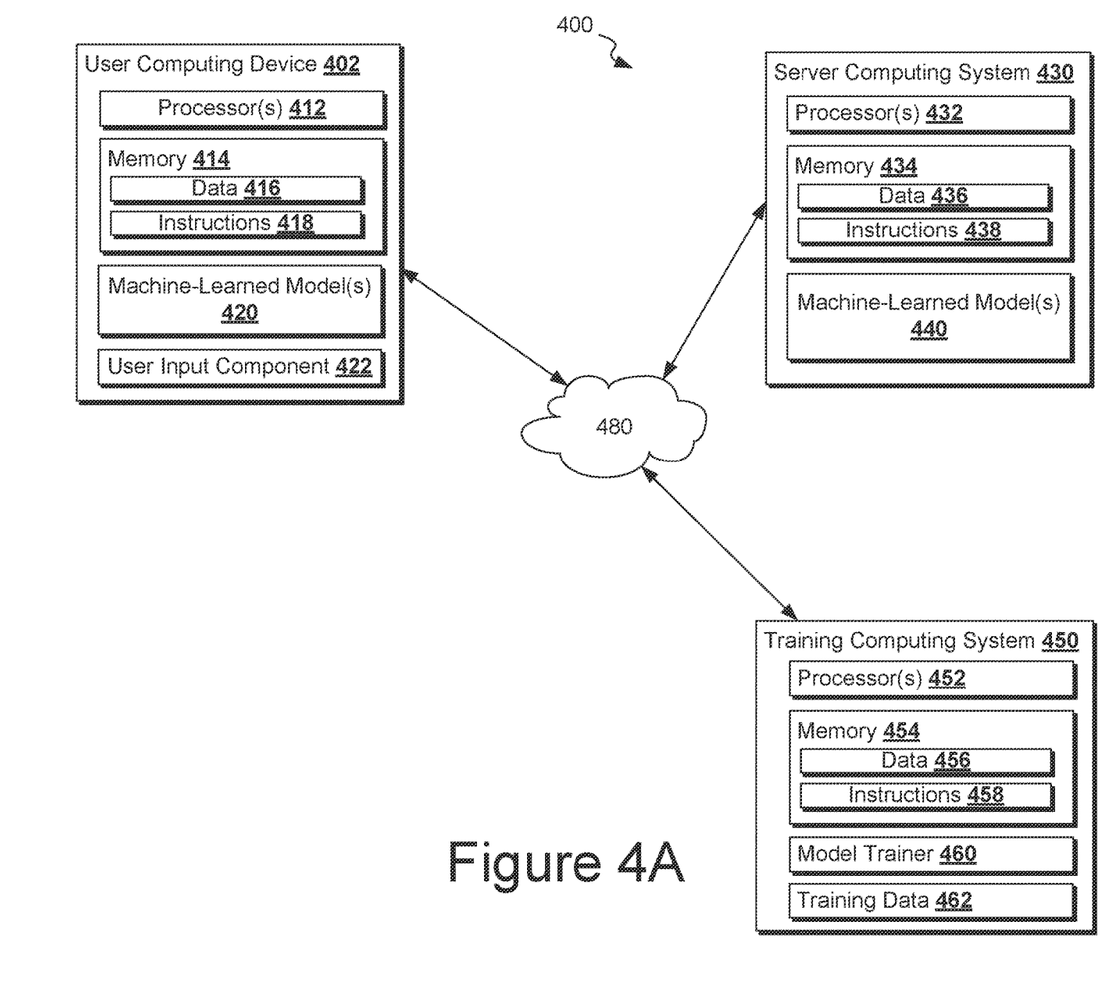
FIG. 4A depicts a block diagram of an example computing system for determining a perceptual quality and optionally training video encoder(s) and/or video decoder(s) according to example aspects of the present disclosure.

FIG. 4A depicts a block diagram of an example computing system 400 that evaluates a perceptual quality of a subject video 104 according to example embodiments of the present disclosure. The system 400 includes a user computing device 402, a server computing system 430, and a training computing system 450 that are communicatively coupled over a network 480.

The user computing device 402 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 402 includes one or more processors 412 and a memory 414. The one or more processors 412 can be any suitable processing device (e.g., a processor core, a microprocessor, an ASIC, an FPGA, a controller, a microcontroller, etc.) and can be one processor or a plurality of processors that are operatively connected. The memory 414 can include one or more non-transitory computer-readable storage media, such as RAM, ROM, EEPROM, EPROM, flash memory devices, magnetic disks, etc., and combinations thereof. The memory 414 can store data 416 and instructions 418 which are executed by the processor 412 to cause the user computing device 402 to perform operations.

In some implementations, the user computing device 402 can store or include one or more machine-learned models 420 (e.g., any one or several of the feature extraction model, the perceptual aggregator model, the perceptual quality model, the video encoder(s), the video decoder(s)). For example, the machine-learned models 420 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 420 can be received from the server computing system 430 over network 480, stored in the user computing device memory 414, and then used or otherwise implemented by the one or more processors 412. In some implementations, the user computing device 402 can implement multiple parallel instances of a single or a set of machine-learned model(s) 420 (e.g., to perform parallel perceptual quality scoring across multiple instances, such as to process one or more frame sets in parallel).

Additionally or alternatively, one or more machine-learned models 440 can be included in or otherwise stored and implemented by the server computing system 430 that communicates with the user computing device 402 according to a client-server relationship. For example, the machine-learned models 440 can be implemented by the server computing system 440 as a portion of a web service (e.g., a perceptual quality scoring service). Thus, one or more models 420 can be stored and implemented at the user computing device 402 and/or one or more models 440 can be stored and implemented at the server computing system 430.

The user computing device 402 can also include one or more user input components 422 that receives user input. For example, the user input component 422 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 430 includes one or more processors 432 and a memory 434. The one or more processors 432 can be any suitable processing device (e.g., a processor core, a microprocessor, an ASIC, an FPGA, a controller, a microcontroller, etc.) and can be one processor or a plurality of processors that are operatively connected. The memory 434 can include one or more non-transitory computer-readable storage media, such as RAM, ROM, EEPROM, EPROM, flash memory devices, magnetic disks, etc., and combinations thereof. The memory 434 can store data 436 and instructions 438 which are executed by the processor 432 to cause the server computing system 430 to perform operations.

In some implementations, the server computing system 430 includes or is otherwise implemented by one or more server computing devices. In instances in which the server computing system 430 includes plural server computing devices, such server computing devices can operate according to sequential computing architectures, parallel computing architectures, or some combination thereof.

As described above, the server computing system 430 can store or otherwise include one or more machine-learned models 440. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 402 and/or the server computing system 430 can train the models 420 and/or 440 via interaction with the training computing system 450 that is communicatively coupled (e.g., over the network 480). The training computing system 450 can be separate from the server computing system 430 or can be a portion of the server computing system 430.

The training computing system 450 includes one or more processors 452 and a memory 454. The one or more processors 452 can be any suitable processing device (e.g., a processor core, a microprocessor, an ASIC, an FPGA, a controller, a microcontroller, etc.) and can be one processor or a plurality of processors that are operatively connected. The memory 454 can include one or more non-transitory computer-readable storage media, such as RAM, ROM, EEPROM, EPROM, flash memory devices, magnetic disks, etc., and combinations thereof. The memory 454 can store data 456 and instructions 458 which are executed by the processor 452 to cause the training computing system 450 to perform operations. In some implementations, the training computing system 450 includes or is otherwise implemented by one or more server computing devices.

The training computing system 450 can include a model trainer 460 that trains the machine-learned models 420 and/or 440 stored at the user computing device 402 and/or the server computing system 430 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 460 can perform a number of generalization techniques (e.g., weight decays, dropouts, etc.) to improve the generalization capability of the models being trained.

In particular, the model trainer 460 can train the machine-learned models 420 and/or 440 based on a set of training data 462. The training data 462 can include, for example, data associating video content and/or image content with viewer feedback (e.g., a score for content input by a viewer while or after viewing the content) regarding the perceptual quality of the content. The training data 462 can include one or more scores or values associated with the content, including, for example, an MOS or other numerical rating, natural language feedback, a preference indicator (e.g., a value indicating a selection of one content item as preferred over another content item), combinations thereof, or other indicators of an opinion regarding the perceptual quality of the content. The training data 462 may also include, for example, data indicating one or more characteristics of the device used to display the content to the user (e.g., manufacturer, model, screen size, screen technology, screen brightness, screen color temperature, screen gamut, screen contrast ratio, screen refresh rate, screen directionality pixel density, maximum frame rendering rate, etc.). The training data 462 may include, for example, data indicating one or more characteristics of the context in which the device was used (e.g., room brightness, room lighting temperature, viewing angle, viewing distance, viewing duration, solo vs. group viewing, etc.). The training data 462 may include, for example, data indicating one or more characteristics of the user (e.g., age, visual impairment, predicted and/or actual interest in content, etc.). The training data 462 may also include, for example, data indicating one or more characteristics of the content (e.g., title, genre, duration, resolution, bit depth, bit depth of any corresponding audio recording, visual or artistic style, target distribution platform, closed captioning, description of scene depicted, etc.).

In some implementations, if the user has provided consent, the training examples can be provided by the user computing device 402. For instance, data in the training data 462 can be collected and/or output by one or more sensors on board the user computing device 402. Thus, in such implementations, the model 420 provided to the user computing device 402 can be trained by the training computing system 450 on user-specific data received from the user computing device 402. In some instances, this process can be referred to as personalizing the model.

The model trainer 460 includes computer logic utilized to provide desired functionality. The model trainer 460 can be implemented in hardware, firmware, and/or software controlling a general purpose processor. For example, in some implementations, the model trainer 460 includes program files stored on a storage device, loaded into a memory and executed by one or more processors. In other implementations, the model trainer 460 includes one or more sets of computer-executable instructions that are stored in a tangible computer-readable storage medium such as RAM, hard disk, or optical or magnetic media.

The network 480 can be any type of communications network, such as a local area network (e.g., intranet), wide area network (e.g., Internet), or some combination thereof and can include any number of wired or wireless links. In general, communication over the network 480 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 402 can include the model trainer 460 and the training dataset 462. In such implementations, the models 420 can be both trained and used locally at the user computing device 402. In some of such implementations, the user computing device 402 can implement the model trainer 460 to personalize the models 420 based on user-specific data.

Figure 4B:
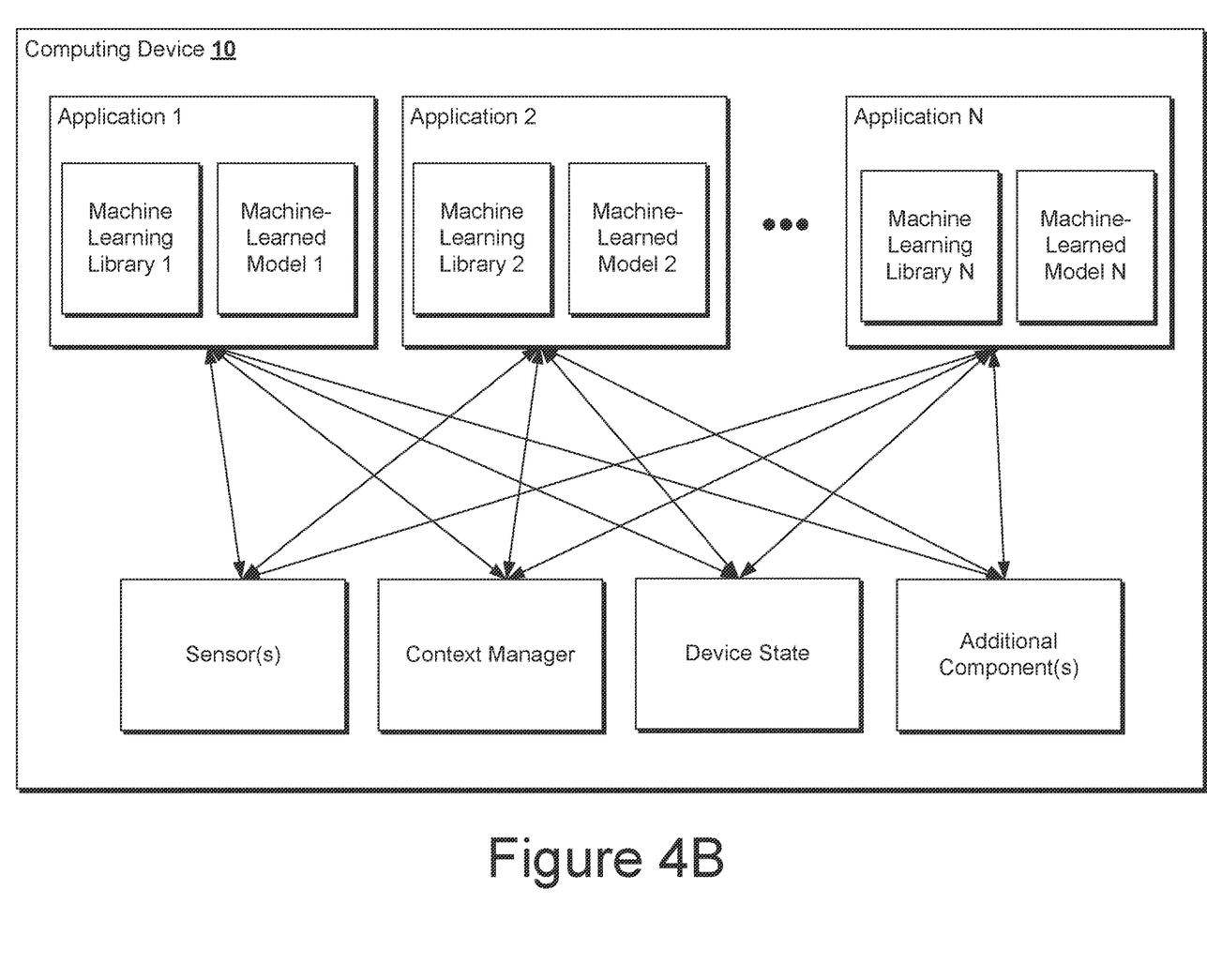
FIG. 4B depicts a block diagram of an example computing device for determining a perceptual quality and optionally training video encoder(s) and/or video decoder(s) according to example aspects of the present disclosure.

FIG. 4B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
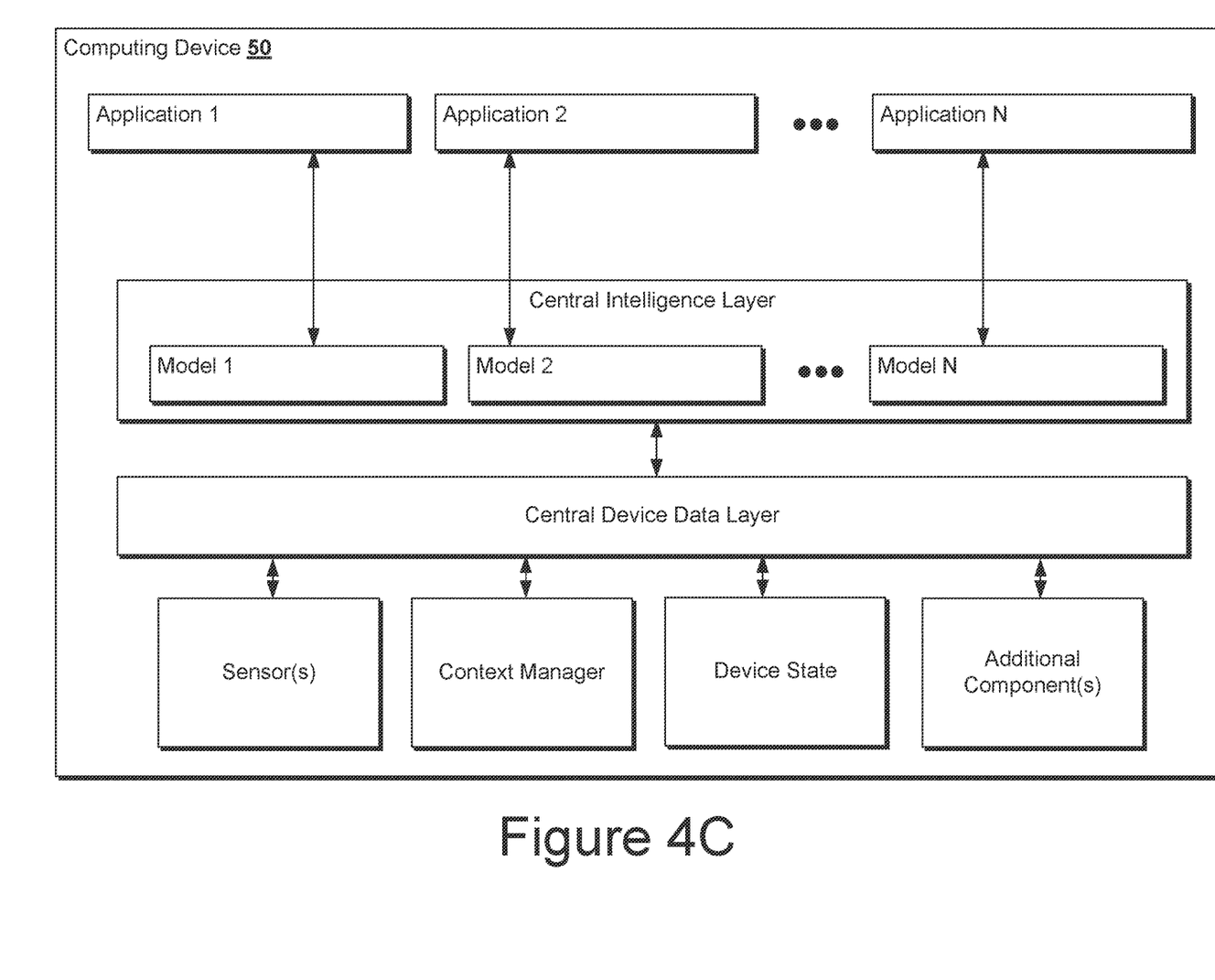
FIG. 4C depicts a block diagram of an example computing device for determining a perceptual quality and optionally training video encoder(s) and/or video decoder(s) according to example aspects of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 5:
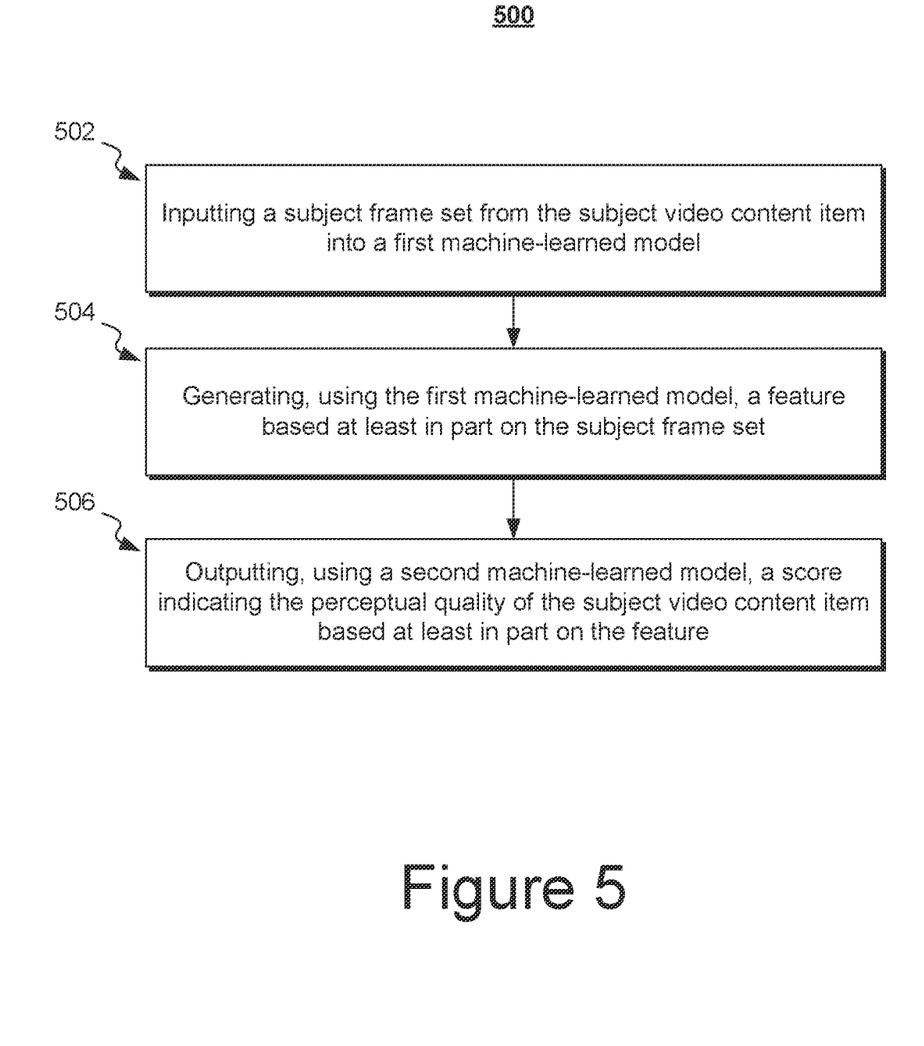
FIG. 5 depicts a flow chart diagram of an example method for determining a perceptual quality and optionally training video encoder(s) and/or video decoder(s) according to example embodiments of the present disclosure.

FIG. 5 depicts a flow chart diagram of an example method for determining a perceptual quality according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

In one embodiment, an example method 500 may be configured for determining a perceptual quality of a subject video content item. In one embodiment of the example method 500, a perceptual quality may correspond to a perceived clarity, definition, smoothness, and/or other user-discernable characteristics of a video content item. For instance, in one embodiment, a perceptual quality may correlate to an opinion of a consumer of video content about the experience with the video content item. The perceptual quality may correlate to, for example, the experience of viewing the video content, the presence of discernible defects or distortions in the video content, whether the video content is displayed in an appealing or pleasing manner, or other factors relating to a consumer's perceptions of the video content. In some embodiments, a perceptual quality can correlate to, for example, a Mean Opinion Score metric, such as according to ITU-T Recommendation P.1204, P.1204.1-5.

At 502, the example method 500 includes inputting a subject frame set from the subject video content item into a first machine-learned model. In one embodiment of the example method 500, the subject frame set comprises two or more frames (e.g., a frame sequence).

At 504, the example method 500 includes generating, using the first machine-learned model, a feature based at least in part on the subject frame set. In one embodiment of the example method 500, the subject frame set includes a frame sequence, and generating the feature includes generating flow data based at least in part on the frame sequence and generating (e.g., using the first machine-learned model) the feature based at least in part on the flow data. For instance, the example method 500 can also include determining a difference between frames in the frame sequence. In some embodiments, the first-machine-learned model includes a model trained to effectively semantically weight input image data. In some embodiments, the first-machine-learned model includes an adapted image classifier model architecture.

At 506, the example method 500 includes outputting, using a second machine-learned model, a score indicating the perceptual quality of the subject video content item based at least in part on the feature.

In some embodiments, the example method 500 includes inputting reference data into the first machine-learned model (e.g., reference data generated based at least in part on a reference frame set from a reference video content item). In one embodiment of the example method 500, the score correlates to a perceptual similarity between the subject video content item and the reference video content item.

In some embodiments, the example method 500 includes generating a second feature based at least in part on a second subject frame set from the subject video content item. In some embodiments, the example method 500 includes determining an aggregate feature based at least in part on the feature and the second feature. In some embodiments, the example method 500 includes inputting the aggregate feature into the second machine-learned model.

In some embodiments, the example method 500 includes determining an objective function based at least in part on the score. In some embodiments, the example method 500 includes updating one or more parameters of a video encoder based at least in part on the objective function. In some embodiments, the example method 500 includes encoding a reference video content item based at least in part on the updated one or more parameters (e.g., the subject video content item is based at least in part on an encoding of the reference video content item).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for determining a perceptual quality of a subject video content item that is based on an encoding of a reference video content item, the method comprising:
   generating, by one or more computing devices, subject flow data based at least in part on a frame sequence of the subject video content item;
   generating, by the one or more computing devices, reference flow data based at least in part on a frame sequence of the reference video content item;
   processing, by the one or more computing devices, the subject flow data and the reference flow data using a first machine-learned model to compare the subject flow data and the reference flow data, wherein processing the subject flow data and the reference flow data using the first machine-learned model comprises processing the subject flow data and the reference flow data using an adapted image classifier model;
   generating, by the one or more computing devices and using the first machine-learned model, a temporal feature based at least in part on the subject flow data and the reference flow data; and
   outputting, by the one or more computing devices using a second machine-learned model, a score indicating the perceptual quality of the subject video content item based at least in part on the temporal feature.

2. The computer-implemented method of claim 1, wherein generating the subject flow data comprises:
   determining, by the one or more computing devices, a difference between frames in the frame sequence of the subject video content item.

3. The computer-implemented method of claim 1, wherein the adapted image classifier model comprises one or more weights re-trained for determining the perceptual quality of the subject video content item.

4. The computer-implemented method of claim 1, wherein the first machine-learned model comprises weights pre-trained on an image classification task.

5. The computer-implemented method of claim 1, comprising:
   generating, by the one or more computing devices, a spatial feature based at least in part on a second subject frame set from the subject video content item; and
   inputting, by the one or more computing devices, the spatial feature into the second machine-learned model;
   wherein the second machine-learned model generates the score based on the temporal feature and the spatial feature.

6. The computer-implemented method of claim 1, comprising:
   for each respective frame set of a plurality of frame sets of the subject video content item, determining a respective temporal feature by comparison to a corresponding frame set of the reference video content item;
   aggregating, by the one or more computing devices, the plurality of temporal features to obtain an aggregate temporal feature; and
   inputting, by the one or more computing devices, the aggregate temporal feature into the second machine-learned model to generate the score.

7. The computer-implemented method of claim 1, comprising:
   updating, by the one or more computing devices, one or more parameters of a video encoder based at least in part on the score.

8. The computer-implemented method of claim 7, comprising:
   encoding, by the one or more computing devices, a reference video content item based at least in part on the updated one or more parameters.

9. The computer-implemented method of claim 1, comprising:
   updating, by the one or more computing devices, one or more parameters of a video encoder and a video decoder based at least in part on the score, wherein the video decoder is configured to decode video content encoded by the video encoder.

10. The computer-implemented method of claim 1, wherein the adapted image classified model comprises a convolutional neural network.

11. The computer-implemented method of claim 1, wherein processing the subject flow data and the reference flow data using the first machine-learned model comprises:
   outputting, from the adapted image classifier model, a layer output of a layer of the adapted image classifier model.

12. The computer-implemented method of claim 1, wherein part of a pre-trained image classifier model is used as the adapted image classifier model.

13. A computing system for determining a perceptual quality of a subject video content item that is based on an encoding of a reference video content item, comprising:
   one or more processors; and
   one or more memory devices storing computer-readable instructions that, when implemented, cause the one or more processors to perform operations, the operations comprising:

generating subject flow data based at least in part on a frame sequence of the subject video content item;
generating reference flow data based at least in part on a frame sequence of the reference video content item;
processing the subject flow data and the reference flow data using a first machine-learned model to compare the subject flow data and the reference flow data, wherein processing the subject flow data and the reference flow data using the first machine-learned model comprises processing the subject flow data and the reference flow data using an adapted image classifier model;
generating, using the first machine-learned model, a temporal feature based at least in part on the subject flow data and the reference flow data; and
outputting, using a second machine-learned model, a score indicating the perceptual quality of the subject video content item based at least in part on the temporal feature.

14. The computing system of claim 13, wherein the adapted image classifier model comprises one or more weights re-trained for determining the perceptual quality of the subject video content item.

15. The computing system of claim 13, wherein the first machine-learned model comprises weights pre-trained on an image classification task.

16. The computing system of claim 13, wherein the operations further comprise:
generating, by the one or more computing devices, a spatial feature based at least in part on a second subject frame set from the subject video content item; and
inputting, by the one or more computing devices, the spatial feature into the second machine-learned model;
wherein the second machine-learned model generates the score based on the temporal feature and the spatial feature.

17. The computing system of claim 13, wherein the operations further comprise:
for each respective frame set of a plurality of frame sets of the subject video content item, determining a respective temporal feature by comparison to a corresponding frame set of the reference video content item;
aggregating, by the one or more computing devices, the plurality of temporal features to obtain an aggregate temporal feature; and
inputting the aggregate temporal feature into the second machine-learned model to generate the score.

18. The computing system of claim 13, wherein the operations further comprise:
determining an objective function based at least in part on the score; and
updating one or more parameters of a video encoder based at least in part on the objective function.

19. The computing system of claim 18, wherein the operations further comprise:
encoding the reference video content item based at least in part on the updated one or more parameters.

20. The computing system of claim 13, wherein the operations further comprise:
updating one or more parameters of a video encoder and a video decoder based at least in part on the score, wherein the video decoder is configured to decode video content encoded by the video encoder.

21. A computing system for determining a perceptual quality of a subject video content item, comprising:
one or more processors; and
one or more memory devices storing computer-readable instructions that, when implemented, cause the one or more processors to perform operations, the operations comprising:
inputting a subject frame set from the subject video content item into a first machine-learned model, wherein the first machine-learned model comprises an adapted image classifier model, wherein the adapted image classifier model comprises one or more weights re-trained for determining the perceptual quality of the subject video content item;
generating, using the first machine-learned model, a feature based at least in part on the subject frame set; and
outputting, using a second machine-learned model, a score indicating the perceptual quality of the subject video content item based at least in part on the feature.

22. One or more memory devices storing:
an encoder configured to compress video content based at least in part on one or more parameters, the one or more parameters trained based at least in part on a score indicating the perceptual quality of decoded video content, the score generated using a second machine-learned model based at least in part on a temporal feature generated using a first-machine-learned model based at least in part on processing flow data and reference flow data for the decoded video content using an adapted image classifier model, the flow data generated based at least in part on a frame sequence of the decoded video content and the reference flow data generated based at least in part on a frame sequence of reference video content, the decoded video content based on an encoding of the reference video content; and
computer-readable instructions that, when implemented, cause one or more processors to generate, using the encoder, an encoded data stream based at least in part on an input video content item.

23. One or more memory devices storing:
a decoder configured to decompress video content based at least in part on one or more parameters, the one or more parameters trained based at least in part on a score indicating the perceptual quality of decoded video content, the score generated using a second machine-learned model based at least in part on a temporal feature generated using a first-machine-learned model based at least in part on processing flow data and reference flow data for the decoded video content using an adapted image classifier model, the flow data generated based at least in part on a frame sequence of the decoded video content and the reference flow data generated based at least in part on a frame sequence of reference video content, the decoded video content based on an encoding of the reference video content; and
computer-readable instructions that, when implemented, cause one or more processors to generate, using the decoder, a decoded video data stream based at least in part on an input encoded data stream.

* * * * *